March 9, 1937. E. W. PATTERSON Re. 20,287

WELL PUMP OPERATING MECHANISM

Original Filed Aug. 10, 1932 2 Sheets-Sheet 1

Inventor.

Edgar W. Patterson.

By

Attorney.

March 9, 1937. E. W. PATTERSON Re. 20,287

WELL PUMP OPERATING MECHANISM

Original Filed Aug. 10, 1932 2 Sheets-Sheet 2

Inventor.

Edgar W. Patterson.

By

Attorney

Reissued Mar. 9, 1937

Re. 20,287

UNITED STATES PATENT OFFICE 20,287

WELL PUMP OPERATING MECHANISM

Edgar W. Patterson, Long Beach, Calif., assignor, by direct and mesne assignments, of one-half to Charles M. O'Leary, Hollywood, Calif., and one-half to Margaret D. Patterson, Long Beach, Calif.

Original No. 2,049,315, dated July 28, 1936, Serial No. 628,124, August 10, 1932. Application for reissue January 6, 1937, Serial No. 119,368

7 Claims. (Cl. 267—1)

This invention has reference to well pump operating mechanisms, the principal objects of the invention being directed toward improvements over the usual walking beam pump operating apparatus.

The principal object of the invention is to provide an apparatus of this character which departs from walking beam rigs in such respects as to afford many comparative advantages from standpoints of both structure and operation and among these objects, particular importance is attached to the provision of a power equalizing system for the pump operating beam, whereby the general operation and efficiency of such mechanisms are materially improved, and the load requirements in the motor or prime mover evened to the extent of avoiding wide variations in the load and corresponding variations in the power input to the motor.

The various objects and improvements embodied in the invention will perhaps be explained most readily and to best advantage without necessity for further preliminary discussion, from the following detailed description of a typical and preferred form of the invention.

Reference is had throughout the description to the accompanying drawings, in which.

Figure 1:
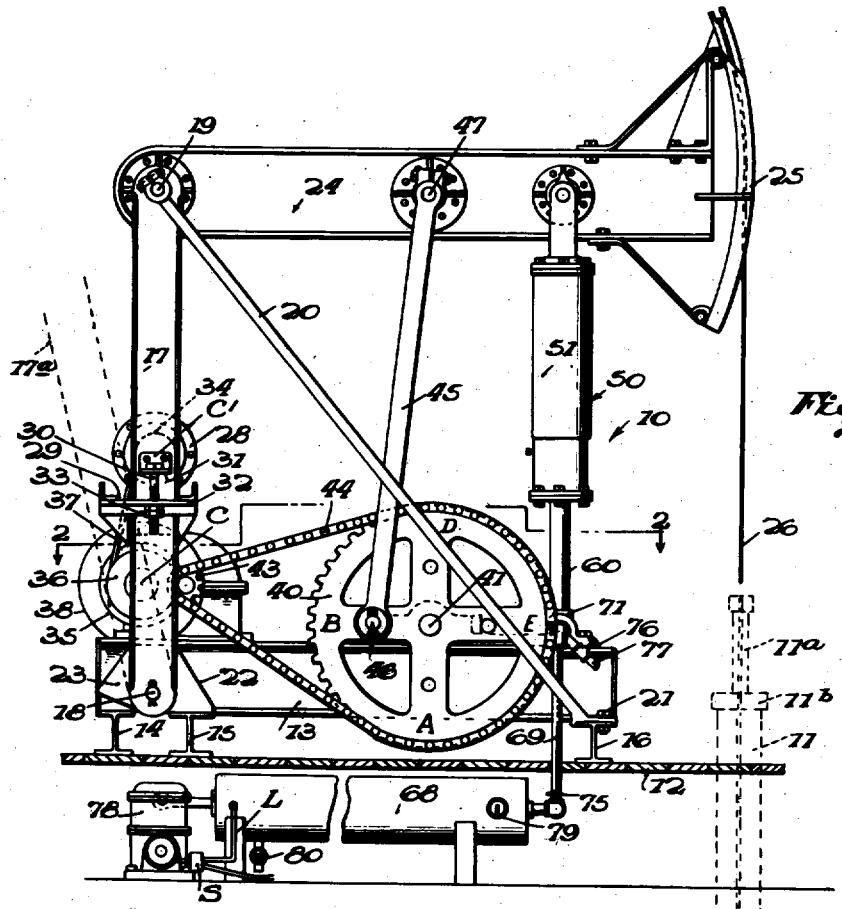
Fig. 1 is a side elevation showing a pump operating mechanism embodying the invention.

Referring first to Fig. 1, the pump operating mechanism, generally indicated at 10, is shown to be arranged adjacent the well casing 11, the latter extending up through the elevated derrick floor 12. The pump operating mechanism preferably is so constructed and arranged as to be supported on a single H-section base beam 13, the latter in turn resting on transversely extending I-beams 14, 15 and 16. The rocking beam supporting structure comprises a pair of posts 17 interconnected at their lower ends by shaft 18 which extends through the central web beam 13 and which provides a pivotal mounting for the posts. The latter are interconnected at their upper ends by shaft 19, the ends of which project beyond the posts to connect with diagonally extending braces 20 which are detachably fastened at 21 to I-beam 16.

Gusset plates 22 are formed integrally with the lower ends of the posts 17 and normally, that is with the posts in vertical positions, rest on I-beam 15. Similar gussets 23 project from the opposite sides of the posts and are adapted to serve as stops to arrest tilting movement of the posts 17, as will more fully appear hereinafter.

A horizontally extending rocking beam 24 is pivotally mounted for vertically oscillatory movement on the central portion of shaft 19, the outer end of the beam carrying the usual segment 25 which is positioned above and in substantially vertical alinement with the head of the well casing 11. As will be understood by those familiar with the art, segment 25 serves as a means for connecting the rocking beam with the well pump rod and the rod clamp and supporting cable, all of which are diagrammatically indicated by the line 26. The pump rod 26 extends downwardly through a packing gland 11a in the well casing head 11b and connects with a vertically reciprocating pump plunger, not shown, at the bottom of the well. The well pump is operated by imparting vertically oscillatory movement to the rocking beam 24 through the driving mechanism which I shall now describe.

A motor 28 is mounted on a platform 29 extending between posts 17, the platform being vertically adjustable to regulate positioning of the motor relative to the gear reduction mechanism to which I later refer. The vertical adjustment for platform 29 may be of any suitable character, and is shown typically as comprising bolts 30 supported on hangers 31 and extending through the top flanges of angle members 32 constituting integral parts of the platform at the outer sides of the posts. Motor 28 and the platform 29 may be moved vertically by adjusting nuts 33. In the present instance, the motor is mounted in such position that the motor driven pulley 34 has its axis substantially in alinement with the center of post 17.

Figure 5:
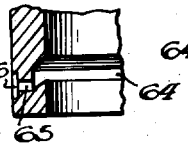
Fig. 5 is a fragmentary enlarged view showing the lubricant carrying pocket at the lower end of the plunger skirt.
Figure 6:
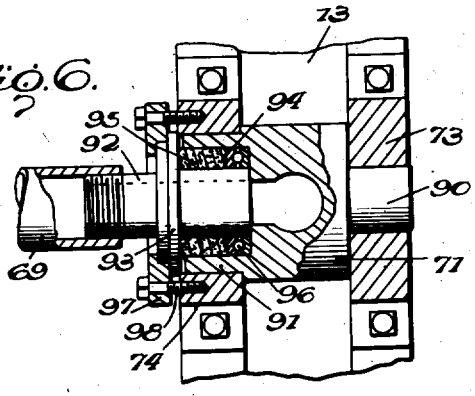
Fig. 6 is an enlarged section on line 6—6 of Fig. 3.

A gear reduction 35 is placed at the base of posts 17 and beneath the motor 28, pulley 36 of the gear reduction being driven from the motor by way of belts or chains 37. In order to stabilize the operation of the drive mechanism and to render the load and power requirements on the motor more uniform throughout the complete operating cycle, a fly wheel 38 is placed on the shaft of the gear reduction. As will be noted in Fig. 5

1, the rotational axis C of the gear reduction pulley 36 is offset from the vertical plane of the motor pulley axis C'. The motor and gear reduction are arranged in the relative positions illustrated in order that when the post 17 and the rocking beam are tilted away from the well casing and to inoperative positions, the driving connection between the motor and the rocking beam will be rendered inoperative. By virtue of the relative offset of the motor and reduction gear pulleys 34 and 36, it will be seen that as posts 17 are tilted on shaft 18 to the dotted line position 17a, the distance between the two pulleys will be reduced to such an extent that the belts 37 will slip on the pulleys, and the drive between the motor and gear reduction will be inoperative.

Figure 2:
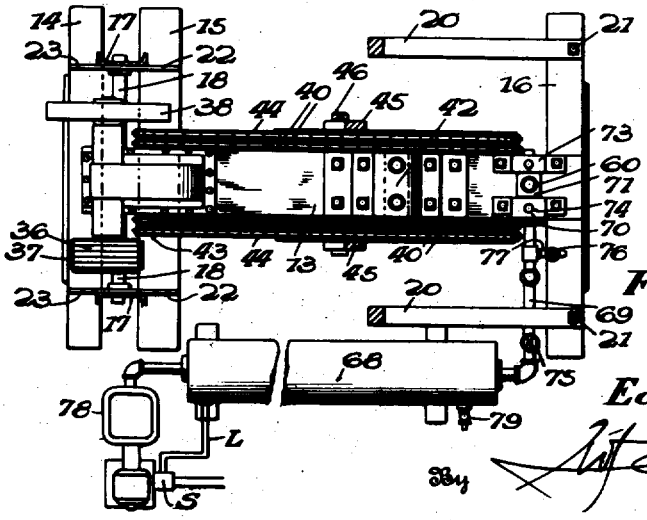
Fig. 2 is a sectional plan taken on line 2—2 of Fig. 1.
Figure 3:
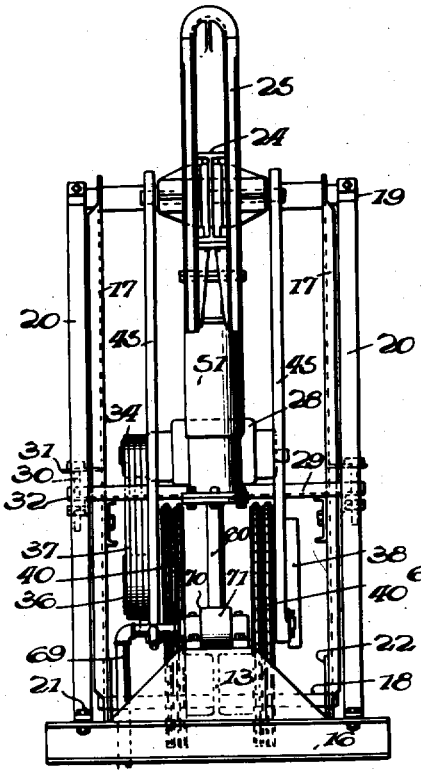
Fig. 3 is an end elevation of the mechanism as viewed from the right in Fig. 1.
Figure 4:
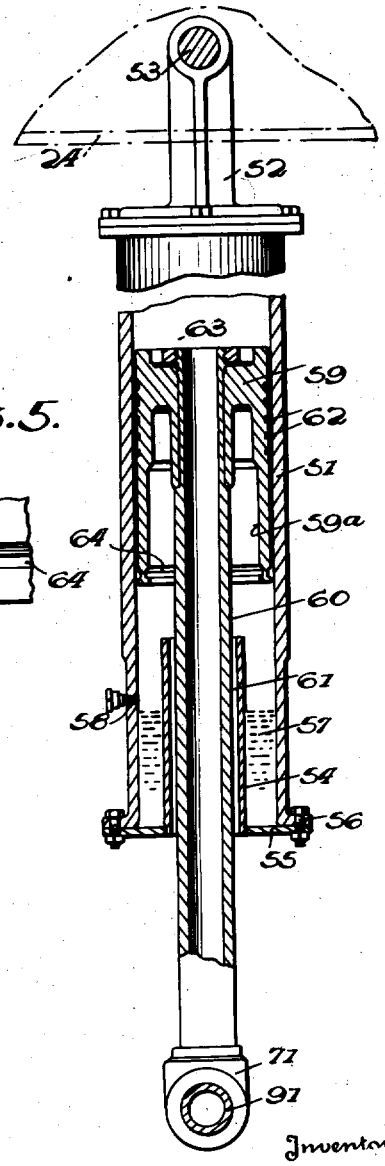
Fig. 4 is a fragmentary enlarged section showing the air cushion cylinder and plunger assembly in detail.

A pair of crank sprockets 40 are mounted at opposite sides of the base beam 13, the sprocket shaft 41 being journaled in a bearing 42, see Fig. 2, attached on the top surface of the beam. Crank wheels 40 are driven from a pair of sprockets 43 on the gear reduction 35 by way of chains 44. Crank wheels 40 are operatively connected with the rocking beam 24 by way of connecting rods 45 pivotally connected to the crank wheels by pins 46, and pivotally attached to the walking beam intermediate its ends, by pin 47. The point of connection of rods 45 with the walking beam may be at any suitable point along the length of the latter, although in the preferred form of the invention as illustrated, such point of connection is at substantially the longitudinal center of the beam.

From a practical standpoint, the described arrangement and mounting of the various parts of the mechanism on the single base beam 13 is of particular advantage, in that the structure is greatly simplified and rendered capable of ease in assembly and transportation where the mechanism is to be used as a portable pumping unit. For purposes of transportation, the mechanism may be bodily moved, with necessity for making but few simple disconnections with the accumulator tank, hereinafter described.

In case it is desired to provide overhead clearance above the well head, as when the pump rod is being pulled from the well, the mechanism may be moved to one side by a simple operation, to permit unobstructed operations above the well casing. As previously mentioned, posts 17 are supported for rocking movement on shaft 18, although normally the posts are rigidly held in their vertical positions by the diagonal braces 20. When it is desired to move the end of the rocking beam from over the well casing, braces 20 may be disconnected from I-beam 16, and posts 17 rocked toward the left to the dotted line position 17a and the rocking beam likewise displaced to the left. Tilting movement of the posts is limited by gusset plates 23 coming to rest on I-beam 14. In its tilted inoperative position, the mechanism cannot be accidentally put into operation due to the drive being disconnected as previously described.

I preferably provide, in conjunction with the mechanism thus far described, a device for cushioning or resisting downward movement of the rocking beam, and while in the broad aspect of the invention any suitable device of this character may be utilized, I preferably provide an air power equalizing attachment whereby the power input is substantially evenly distributed throughout the 360° cycle or complete operating revolution of the device.

In its preferred form, the air power equalizing comprises a cylinder and plunger assembly, attached to the rocking beam 24 preferably at a point intermediate its outer end and the point 47 of the attachment of the connecting rods therewith. The assembly 50 comprises a cylinder 51 having a hanger 52 attached to its upper end and pivotally connected with the rocking beam by pin 53. A pipe 54 projecting upwardly within the lower interior of the cylinder and annularly spaced from the wall thereof, is carried on a plate 55 attached to the end of the cylinder by bolts 56. The annular space 57 provides a lubricant containing chamber within which the lower portion of the plunger dips to carry lubricant to the upper portion of the cylinder wall, as will presently appear. Lubricant may be injected into the chamber 57 by way of a plugged opening at 58.

Plunger 59 is attached to the upper end of tubular rod 60 extending through the lower end of the cylinder with a suitable clearance at 61 from pipe 54. The plunger may carry a series of rings 62 or any other suitable means for preventing leakage of air from the compression chamber 63. In order to assure ample lubrication for the plunger, the latter is provided with a downwardly extending skirt portion 59a which, when the cylinder is raised to an upper position, dips into the lubricant in annular space 57. As a means for insuring carrying and distribution of the lubricant by the plunger along the upper walls of the cylinder, I provide within the interior of the skirt an annular undercut groove 64, see Fig. 5, which serves essentially as a pocket to retain a quantity of lubricant sufficient to carry through the travel of the plunger in the upper portion of the cylinder. A plurality of ports 65 lead from the lubricant pocket 64 to a shallow annular groove 66 in the outer face of the plunger. Upon relatively upward movement of the plunger within the cylinder, the lubricant carried in pocket 64 feeds through port 65 into grooves 66 and into contact with the wall of the cylinder. It will be noticed that the lubricant is prevented from escape or leakage from the cylinder by being trapped in the annular space 57, into which any excess lubricant between the working parts will drain.

The tubular plunger rod 60 has at its lower end a pivotal anchor 67 which permits oscillatory movement of the rod as the cylinder 51 is vertically reciprocated by the rocking beam. An accumulator or air reservoir 68 communicates with the compression chamber 63, within cylinder 51, through the tubular plunger rod and by way of pipe 69 connecting through pivotal joint at 70 with the plunger rod. Any suitable connection may be made between the plunger rod and pipe 69, there being shown as typical and preferred, however, a fitting 71 attached to the lower end of the rod and carrying trunnions 91 and 92 journaled in bearings 73 and 74. A nipple 92 having a flange 93, projects into the bore 94 of trunnion 91, and a fluid tight joint between the parts is afforded by packing 95 confined within bore 94 by flange 93. Oscillatory movement of the trunnion relative to the packing is facilitated without disturbing the packing, by inserting ball race 96 within the trunnion bore. Nipple 92 is held in place and flange 93 kept in pressural engagement with the packing, by a clamping ring 97 engaging the nipple flange and attached to bearing 74 by screws 98. By virtue of the described joint construction, free oscillatory movement of plunger rod 60 is permitted while in connection with pipe 69, and leakage at the joint effectively prevented.

A valve 75 may be placed in line 69 to close off communication between the cylinder and accumulator, and a second valve 76 placed in release nipple 77 through which, after valve 75 is closed, the air may escape from the cylinder. This combination of valves is provided in order that in case it is desired to adjust the vertical position of the pump plunger or rod entailing vertical movement of the rocking beam, such adjustment may be made without the necessity for having to exhaust the air from the accumulator.

Air is supplied to accumulator tank 68 by a suitable compressor 78, and the air pressure within the accumulator being maintained at a predetermined minimum pressure by means of a suitable pressure controlled switch S in the motor circuit and connected to the accumulator by line L. A pressure release valve for the accumulator is diagrammatically indicated at 79, and a blow-off connection at 80. The accumulator and compressor may be placed at any suitable location, although I preferably place them away from the derrick floor in order to minimize obstructions around the well head.

Being operated through its connection with the crank wheels 40, it will be seen that the rocking beam 24 travels in simple harmonic motion in its vertical oscillatory movement, and that therefore that the well pump rod 26 is operated in vertical simple harmonic motion. The travel of the crank pin 46 within the angular interval between points A and B, see Fig. 1, is one of acceleration in the rate of vertical movement of the crank pin, and therefore the rocking beam; whereas the interval between points B and D is one of deceleration in the rate of vertical movement of the pin and rocking beam. Similarly, during downward travel of the crank pin and rocking beam, the angular interval between points B and D is one of acceleration in the rate of downward movement, and the interval between E and A, one of deceleration. It follows therefore that during the intervals of acceleration between A—B, and D—E, a greater load is imposed on the motor, than during the intervals of deceleration.

A particularly outstanding feature of the invention resides in controlling the air pressures in the air cushion cylinder and accumulator, so as to minimize load variations on the motor and to generally increase the operating efficiency of the mechanism. It is further desired to maintain the air pressure in the accumulator and power equalizing cylinder at a predetermined value that will tend to even the load requirements on the motor in driving the rocking beam in simple harmonic motion; or in other words to reduce the relative load variations on the motor between the periods of acceleration, corresponding to travels of the crank pin 46 in the intervals A—B, D—E, and the periods of deceleration in intervals B—E and A—E.

It will be unnecessary to illustrate and to describe in detail, the characteristics of the usual single acting well pump, since the generalities of such pumps are well established and familiar to those in the industry. It may be noted that in the operation of such pumps, the total load to be lifted will be the weight of the pump rods and pump parts attached thereto, plus the total weight of the fluid supported by the pump plunger. During the down stroke of the pump, the total fluid load is assumed by the standing valve of the pump, and the only weight exerting a downward pull on the beam is the weight of the pump rods and pump parts attached thereto. Hence the difference in the weights supported by the beam during the up and down strokes of the pump, will be the weight of the fluid supported by the pump plunger.

Preferably the air pressure in the accumulator will be maintained at a predetermined value such that the upward pressure exerted against the cylinder head in compression chamber 63, will be sufficient to support the total weight of the well pump and pump rods, plus one half of the weight of fluid to be lifted. The operation may be clearly understood from the following formulae in which L=combined total load, R=weight of rods, and F=weight of fluid. From these values it will be seen that $F+R=L$.

Let A=air pressure, or rather the lifting force due to the air pressure, and assume the value of R to be 1000 pounds, and the value of F to be 1000 pounds, the value of A will be 1500 pounds, or—

$$R+\frac{F}{2}$$

hence, during the up stroke of the beam, the load to be raised is $R+F$ or 2000 pounds. There will be $(R+F)-A$, or 500 pounds of unequalized load to be lifted by the input power from the motor or prime mover during the up stroke. During the down stroke of the beam, the power requirement will be that necessary to move the beam down against the lifting power of A, which will be $1500-R$ or 500 pounds. Thus the following power formulae apply:

Up stroke—$R+F=2{,}000-A=500$ pounds
Down stroke —$A=1{,}500-R=500$ pounds hence the power factor for both the up and down strokes is equalized, as noted in the above formulae. In actual practice, the equalization of power input may be carried out beyond the disclosures of the formulae, by regulating and controlling the variants of air pressure at different points throughout the cycle, as hereinafter described.

One purpose for providing an accumulator tank of substantially greater volume than the displacement volume of cylinder 51, that is, the volume displaced by the plunger between the limits of its stroke, is to prevent the building up of excessive air pressure upon downward movement of the rocking beam. In order to maintain or approach even distribution of load on the motor throughout the operating cycle, it is not intended that power should be expended only in moving the rocking beam down and that during this movement the air in the cylinder and accumulator shall be compressed to the point that the rocking beam will be raised at the desired rate of movement by air pressure alone, and without taking power from the motor.

On the contrary, it is intended that the volume of the accumulator will be such that excessive building up of air pressure will not result upon the downward movement of the rocking beam, so that excessive power will not be required from the motor during this half of the cycle, and that while the compressed air will aid the motor in moving the rocking beam through its upward travel, part of the load, at the desired acceleration, will be taken by the motor. It is found in average practice, the desired pressure conditions can be maintained within the system, by providing an accumulator having a volume of from 15 to 20 times the displacement volume of the cylinder 51.

In describing the operation, it may be assumed that the rocking beam is starting on its downward movement with crank pin 46 moving in a clockwise direction from point D. The angular interval of travel between points D and E is one of acceleration, and a greater load is imposed on the motor than between the interval E—A of deceleration. In the intervals D—E, however, less resistance is offered by reason of compression of the air in chamber 63 during the corresponding first half of the downward travel of the cylinder, since the air pressure in the system is lower than that existing during the second half of the downward movement. Thus there is a compensation for the variation in load requirements on the motor between the intervals D—E and E—A, in that during the former interval of acceleration and in which the higher load requirements exist, less resistance is offered by the compressed body of air, whereas during the interval E—A of deceleration, in which the load on the motor decreases substantially, the resistance offered by compression of the air during the last half of the cylinder stroke has increased to the extent of maintaining a load on the motor.

In the upward movement of the rocking beam, the power requirements of the motor during the interval A—B of acceleration, and therefore greatest load, is decreased by reason of the upward pressure exerted on the cylinder 51 by the compressed air. During the second half of the upward travel, corresponding to the deceleration interval B—D, the pressure of the compressed air will have decreased to the point at which power will be required from the motor to complete the upward travel of the rocking beam at the desired rate of movement.

From the foregoing it will be seen that at no interval in the operating cycle, is the motor free from load, nor is it driven through reverse operation of the mechanism so as to result in power input back into the line. It will also be observed that in view of the reduction in variations of the motor load throughout the cycle, caused by control of the air pressure, the power requirements of the motor throughout the operating cycle will not be susceptible to abrupt changes, and the power curve of the motor will be relatively even.

Of all the factors to be reckoned with in the pumping of a well from great depths, only one is constant and the rest are variables, the constant or known quantities being the rod and plunger weights. However, where the actual lifting torques can be calculated as in a pumping device of the character disclosed where the rod and plunger weights are known, and the exact pressure in the system under which power equalization is obtained, may also be closely predetermined, by proper regulation, all the variables such as friction, specific gravity of fluid, and acceleration factors for rods and fluid loads, can be easily calculated to a close degree of accuracy.

I claim:

1. In well pumping apparatus having a vertically extending air cushion cylinder attached to an oscillatory rocking beam, the combination comprising a plunger within said cylinder, a downwardly extending skirt on said plunger, and a wall forming with the cylinder an annular lubricant containing reservoir within the lower portion of the cylinder and into which the plunger skirt dips upon its relative downward movement within the cylinder, said wall also forming an air passage freely venting said reservoir to the atmosphere from above the liquid in said reservoir.

2. In well pumping apparatus having a vertically extending air cushion cylinder attached to an oscillatory rocking beam, the combination comprising a plunger within said cylinder, a downwardly extending skirt on said plunger, and a wall forming with the cylinder an annular lubricant containing reservoir within the lower portion of the cylinder and into which the plunger skirt dips upon its relative downward movement within the cylinder, the space occurring above the lubricant confined within said reservoir being freely vented to the atmosphere throughout substantially the full range of the plunger travel.

3. In well pumping apparatus having a vertically extending air cushion cylinder attached to an oscillatory rocking beam, the combination comprising, a plunger within said cylinder, a downwardly extending skirt on said plunger, a plunger rod extending downwardly through the cylinder, and an annular wall within the lower portion of the cylinder forming a lubricant containing reservoir into which the plunger skirt dips, said wall being annularly spaced from both the plunger rod and the plunger skirt when the latter is in its relatively downward position in the cylinder, the space occurring above the lubricant confined within said reservoir being continuously vented to the atmosphere through the space between said wall and the plunger rod.

4. In a well pumping apparatus having a rocking beam oscillating with relation to a fixed base, a cylinder pivotally dependent from the free end of the rocking beam, a piston rod pivotally connected to the fixed base, a piston carried by the rod reciprocating within the cylinder, an end wall extending across the lower end of the cylinder and through which the piston rod reciprocates, an upwardly extending sleeve mounted at its lower end on the end wall and with the lower portion of the cylinder forming a liquid lubricant reservoir, said sleeve extending to a point higher than the level of the liquid in the reservoir and having an inside diameter materially greater than the outside diameter of the piston rod whereby a free circulation of air may take place from the reservoir to the atmosphere at all times, a skirt formed on the piston and adapted to telescope over the upwardly extending portion of the sleeve and to dip into the liquid lubricant at its lower end whereby liquid may be carried upwardly thereby, the inside diameter of the skirt being greater than the outside diameter of the sleeve to permit continued communication of the reservoir with the atmosphere.

5. In a well pumping apparatus having a rocking beam oscillating with relation to a fixed base, a cylinder pivotally dependent from the free end of the rocking beam, a tubular piston rod pivotally connected to the fixed base, a piston carried by the rod reciprocating within the cylinder, an end wall extending across the lower end of the cylinder and through which the tubular piston rod reciprocates, an upwardly extending sleeve mounted at its lower end on the end wall and with the lower portion of the cylinder forming a liquid lubricant reservoir, said sleeve extending to a point higher than the level of the liquid in the reservoir and having an inside diameter materially greater than the outside diameter of the piston rod whereby a free circulation of air may take place from the reservoir to the atmosphere at all times, a skirt formed on the piston and adapted to telescope over the upwardly extending portion of the sleeve and to dip into the liquid lubricant at its lower end whereby liquid may be carried upwardly thereby, the inside diameter of the skirt being greater than the outside diameter of the sleeve to permit continued communication of the reservoir with the atmosphere, a fluid connection to the lower pivotal end of the piston rod, and a fluid passage way from the upper end of the piston rod through the piston whereby flow of compressed fluid within the cylinder may take place.

6. A counterbalancing device for use with the walking beam of a well pumping mechanism, said device comprising the combination of a cylinder, piston and piston rod, constituting an air cushion in connection with the said beam, an air storage tank having connections with said cylinder for supplying pressure thereto constantly during operation, means for maintaining a predetermined constant pressure in said tank, a manually controlled cut-off valve in said connections, and a manually controlled exhaust valve for the cylinder located between the latter and the said cut-off valve, said valves being operable to disconnect the cylinder from the tank pressure and to bleed the cylinder to the atmosphere.

7. A counterbalancing device for use with a well pumping mechanism including a walking beam in connection with and operating a pump rod, said device comprising the combination of a cylinder, piston and piston rod, constituting a cushioning means for the walking beam in its operation and a pressure actuated moving means and support for the said beam when the latter is stationary, a pressure tank having connection with said cylinder for supplying pressure thereto constantly during operation, means for maintaining a predetermined constant pressure in said tank, a manually controlled cut-off valve in said connections between the tank and cylinder, and a manually controlled exhaust valve for the cylinder located between the latter and the said cut-off valve, said valves being operable to disconnect the cylinder from the tank and to bleed the cylinder to the atmosphere whereby the walking beam may be raised and lowered under cylinder pressure in respacing the walking beam with respect to its pump rod.

EDGAR W. PATTERSON.